April 6, 1954  H. S. ALEXANDER  2,674,153
VISION CLASSIFIER INSTRUMENT
Filed May 22, 1951  2 Sheets-Sheet 1
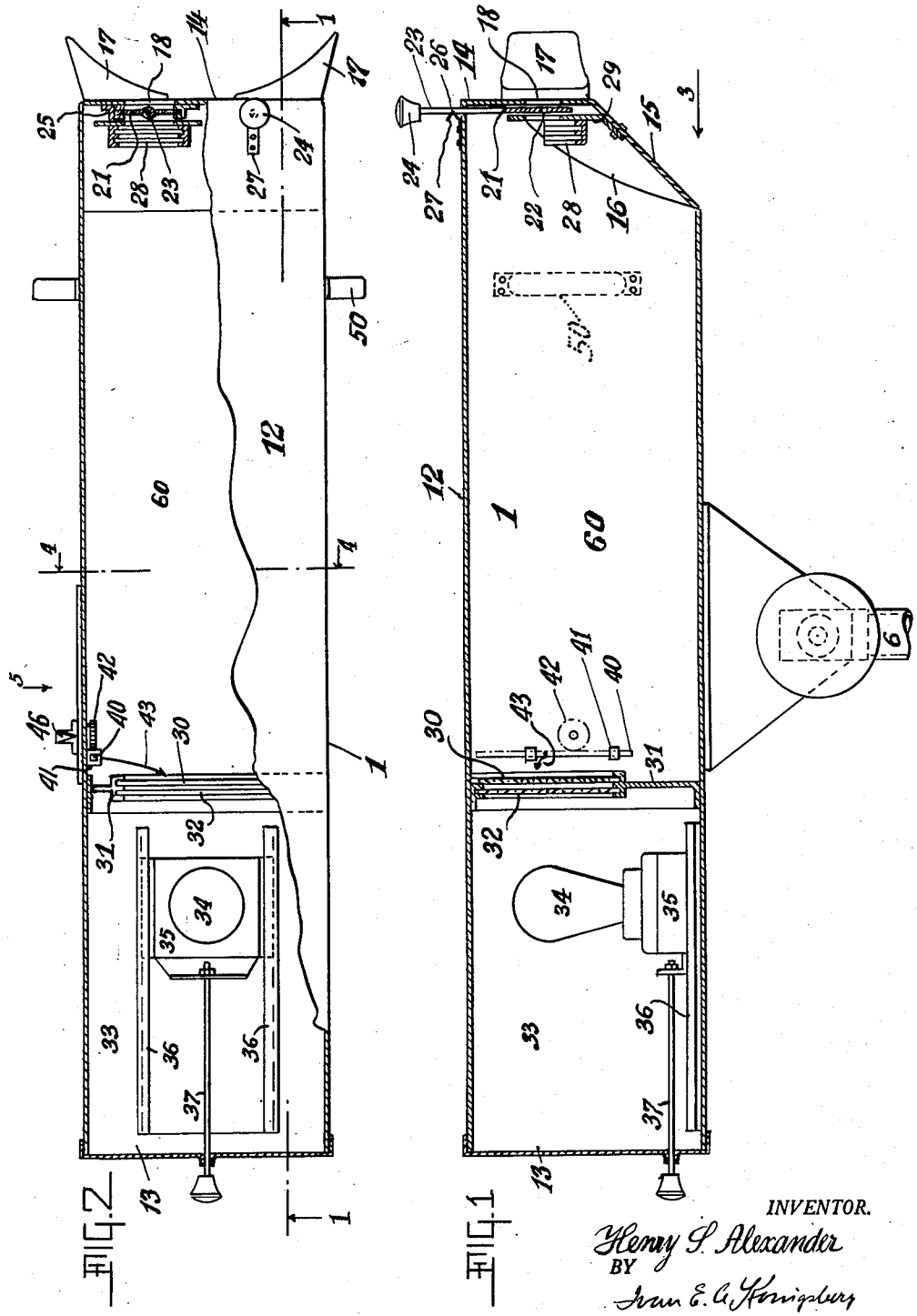
INVENTOR.
Henry S. Alexander
BY
Ivan E. A. Konigsberg
ATTORNEY April 6, 1954     H. S. ALEXANDER     2,674,153
VISION CLASSIFIER INSTRUMENT
Filed May 22, 1951     2 Sheets-Sheet 2
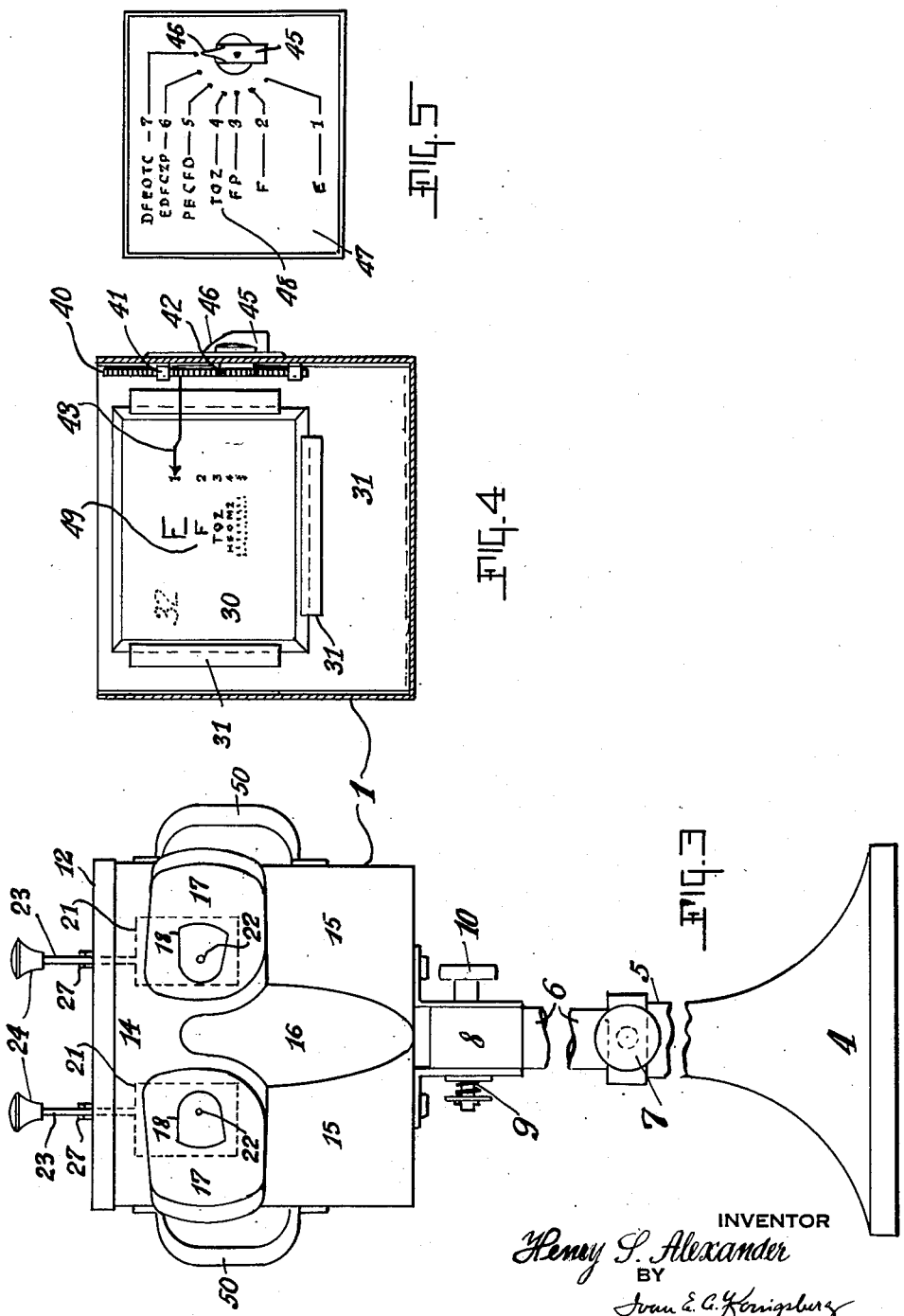

Patented Apr. 6, 1954

2,674,153

UNITED STATES PATENT OFFICE 2,674,153

VISION CLASSIFIER INSTRUMENT

Henry S. Alexander, Meadville, Pa., assignor to Keystone View Company, Meadville, Pa., a corporation of Pennsylvania Application May 22, 1951, Serial No. 227,645

1 Claim. (Cl. 88—20)

The object of this invention is to provide a vision classifier instrument for testing a person's visual acuity and to determine to what extent it might be improved by the use of proper corrective lenses.

Another object of the invention is to provide such an instrument of simple, practical and efficient design and construction with mechanisms for conducting visual acuity tests accurately and expeditiously.

Accordingly, the invention is embodied in an instrument in which a vision testing card or slide, for example a "Snellen" chart, is supported to be viewed by the subject through openings of different sizes and under different light conditions. The embodiment includes certain pointing and indicia registering mechanisms to enable the examiner to conduct the test in a practical efficient manner. Other features of the invention will appear from the following specification with reference to the accompanying drawings in which Fig. 1 is a longitudinal sectional view through the instrument taken substantially on the line 1—1 of Fig. 2 with parts broken away.

Fig. 2 is a top plan view looking down upon Fig. 1 with the cover of the instrument partly removed.

Fig. 3 is a front view, with parts broken, looking in the direction of the arrow 3 in Fig. 1.

Fig. 4 is a transverse sectional view on the line 4—4 in Fig. 2.

Fig. 5 shows the registering and pointing mechanism on the outside of the instrument housing and looking in the direction of the arrow 5 in Fig. 2.

The instrument comprises a housing or box 1, Fig. 3, which is tiltably supported on a stand having a base 4 with a tubular column 5. A second tube 6 slides within the tube 5 for vertical adjustment, conventional securing means being shown at 7. The tube 6 has a head 8 which pivotally supports the box 1 on a friction pivot 9 operated by a hand knob 10 so that the instrument may be clamped to the stand and at the same time permit angular inclination.

The box 1 has a removable lid or cover 12. The rear end 13 of the box is open. The front end 14 is cut back at an angle of about forty five degrees as at 15 and is indented as at 16 forming a head rest providing face, nose and breath clearance as one looks into the instrument. The front 14 also carries two eye shades 17 to exclude as much outside light as possible. The front has two view openings 18, 18 which are full size to accommodate wide or narrow pupillary distances with plenty of clearance.

Opposite each of the view openings on the inside of the front 14 there is provided a vertically slidable plate 21 having a pin hole 22. The plate has a stem 23 with an operating knob 24 for placing the plate in side guides 25, Fig. 2. The stem has a notch 26 and the box carries springs 27 adapted to engage the notches to maintain the plates in positions in which the pin holes are in the line of sight. The dimensions of the plates 21 are such that when the knob is pressed down till the plate touches bottom, the entire view opening is covered and when the knob is pulled clear up until it touches the top 12, the opening 18 is entirely open. When the plate is in a mid position and the spring 27 engages the notch 26 the pin hole will register with the opening and the axes of the optical system.

Next to the pin hole plate a lens well is provided on supports 29. The well is open at the top for the insertion of the required lenses for tests. It has been desirable to use a 2½ dioptre lens for the tests. This lens has a focal distance of about 15¾ inches, hence a transparency head comprising a transparent test slide 30 is placed the focal distance away from the lens in suitable guides 31 which also support a diffusion glass or screen 32 back of the slide. The latter is a reduced representation of a "Snellen" chart or other vision testing chart.

Back of the screen 32 the box forms a light chamber 33 which contains an electric lamp 34 mounted on a base 35 which is slidably mounted in guides 36. The lamp is moved in the guides by means of a handle 37. The box forms a viewing chamber 60 in front of the test slide 30.

It is desirable that the examiner should be able to point to desired lines on the test slide rather than indicating them by number. A pointer mechanism is therefore a feature of this invention. Inside the box there is provided a vertically movable rack 40 in supports 41. The rack is moved up and down by a gear 42 and carries a wire pointer 43 directed toward the slide. The gear is turnable from the outside of the box by a hand knob 45 having a pointer 46 which is moved over the lines and letters on a chart 47. The lines and letters 48 being repetitions of the test slide marks 49. The arrangement is such that the outside marks are easily visible to the examiner and rotation of the outside pointer will cause it to move over the marks in synchronism with the movements of the inside pointer 43 as will be understood.

The box has two side handles 50 which are grasped by the person to be examined so that he can rest his head easily against front of the box and adjust the box to suit his height.

When a test is to be made, the lamp is moved to the back of the box and the lens is placed in the lens well. The observer reads the test slide through the view openings 18 and establishes his visual acuity with each eye. Thereafter the pin hole plate is positioned in front of the lens and the lamp is moved forward into the front position shown. The observer now reads the test slide through the pin holes 22. The increased illumination from the lamp compensates for the decreased "pupil area" of the pin hole. The second reading indicates the limit of visual acuity that can be obtained by the use of corrective lenses. This is the same as if he were reading a standard wall chart at its specified distance in a room. This is a first reading and if he passes it satisfactorily, he is passed without further test. If the observer fails in this first reading test, he is given the test through the pin hole aperture to determine whether and to what extent his eye faults can be corrected since a pin hole is in effect a lens of universal focus.

The standard use of a "Snellen" chart is at 20 feet distance direct reading. Viewing the reduced-size chart at 15¾ inches gives the same result. The function of the pin hole is to clarify the image according to known optical principles. The transparency head, i. e. test slide and diffusion screen, is so designed that when the lamp is at the back of the box the illumination on the slide will be between 12 and 18 foot candles.

During the test the examiner will operate the outside pointing device in accordance with the marks thereon and note the reactions of the subject. The pin hole test is under conditions of controlled light which include elimination of outside light, the space in front of the test slide being enclosed by the box and the transverse guide members 31, and control of the inside light. If a person fails to reach the required line on the test slide through the view openings, the pin hole plate is placed in front of the eyes and he is required again to read.

I claim:

A vision classifier for ascertaining the visual ability of a subject comprising an oblong closed box forming an oblong chamber, a transverse transparency head within said chamber consisting of a test slide and a superposed light transfusion screen, partition supports for said transparency head forming with the sides of said box a closed test slide viewing chamber in front of the transparency head and a closed illumination chamber behind the same, pupillary sight openings in the front end of said box for viewing the entire said test slide, means inside said box for detachably supporting viewing lenses therein in alinement with said sight openings, a pin hole plate for each of said openings, means accessible from the outside of said box for adjusting said pin hole plates with respect to the said test slide and the said view openings, springs for adjustably supporting said pin hole plates either in the position in which the pin holes therein are in alinement with said sight openings, or in the position in which said pin hole plates are removed from the line of sight through said sight openings, a movable lamp in said illumination chamber for illuminating the entire transparency head from behind the same and movable towards or away from said transparency head, a handle extending from said lamp to the outside of said box for moving the lamp into predetermined positions depending upon the test being made with said apparatus, test indicia marks on said test slide and pointer means operable from outside said box to register with the said test marks on the slide whereby the visual ability of the subject may be ascertained.

References Cited in the file of this patent

UNITED STATES PATENTS

| Number | Name | Date |
|---|---|---|
| 505,000 | Price | Sept. 12, 1893 |
| 929,134 | Hughes | July 27, 1909 |
| 1,704,811 | Stuber | Mar. 12, 1929 |
| 2,481,582 | Ellis | Sept. 13, 1949 |
| 2,485,272 | Freeman | Oct. 18, 1949 |